United States Patent
Ostroski et al.

(10) Patent No.: US 6,321,769 B2
(45) Date of Patent: *Nov. 27, 2001

(54) INJECTION PRESSURE SENSOR SEALING MECHANISM

(75) Inventors: Gregory Michael Ostroski, Whitmore Lake; Lamar L. King, II, Dearborn, both of MI (US)

(73) Assignee: Ford Global Technologies, Inc., Dearborn, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/490,295

(22) Filed: Jan. 21, 2000

(51) Int. Cl.[7] .............................. F16K 17/36; F16L 55/10; F02B 77/08
(52) U.S. Cl. .......................... 137/68.14; 137/38; 137/67; 137/68.11; 73/119 A; 73/756; 123/198 D
(58) Field of Search .............. 137/38, 67, 68.11, 137/68.14; 123/198 D, 456, 494; 73/119 A, 756

(56) References Cited

U.S. PATENT DOCUMENTS

| | | |
|---|---|---|
| 3,963,055 * | 6/1976 | DeRosa .................................. 137/67 |
| 3,994,357 | 11/1976 | Smitley . |
| 3,994,359 | 11/1976 | Smitley . |
| 3,994,360 | 11/1976 | Leibold . |
| 3,995,710 | 12/1976 | Courtot . |
| 4,237,926 | 12/1980 | Walker . |
| 4,275,753 * | 6/1981 | Willaims ............................... 137/38 |
| 4,282,801 * | 8/1981 | Basch et al. .......................... 92/102 |
| 5,133,323 | 7/1992 | Treusch . |
| 5,476,080 * | 12/1995 | Brunnhofer ........................... 123/468 |
| 5,630,387 * | 5/1997 | Kamiyama ....................... 123/184.38 |
| 5,918,282 * | 6/1999 | Schwager et al. ..................... 73/756 |
| 6,085,598 * | 7/2000 | Baba et al. ............................ 73/756 |

* cited by examiner

*Primary Examiner*—John Rivell
*Assistant Examiner*—Ramesh Krishnamurthy
(74) *Attorney, Agent, or Firm*—Jerome Drouillard

(57) ABSTRACT

An injection pressure sensor (10) intended for use with a fluid source (12). The injection pressure sensor (10) has a sensor element (14). and a tube member (18). The tube member (18) creates a fluid pathway (20) between the fluid source (12) and the sensor element (14). The tube member (18) contains a collapsible portion (22), such that when the tube member (18) is bent, the fluid pathway (20) is generally closed.

23 Claims, 2 Drawing Sheets

INJECTION PRESSURE SENSOR SEALING MECHANISM

TECHNICAL FIELD

The present invention relates generally to an injection pressure sensor sealing mechanism and more particularly to improvements to an injection pressure sensor sealing mechanism to prevent fuel leakage in the event of a crash.

BACKGROUND ART

Injection pressure sensors (IPS) are well known in the automotive industry. Injection pressure sensors are commonly mounted directly to the fuel rail. IPS devices are used to monitor the pressure of the fuel within the fuel rail relative to the manifold pressure to assist in the regulation and control of the fuel injectors.

Performance issues alone, however, should not govern the design of IPS devices. The modern automotive design is not only driven by cost and performance concerns, but by failure considerations as well. Systems within the automobile are often designed such that they will not create excessive cost or collateral damage issues for the consumer if they fail or if the vehicle is involved in a crash.

Since IPS devices are commonly attached to the fuel rail, they have the potential to create cost and collateral damage issues if they are affected during a vehicle accident. An accident that damages or breaks the IPS device has the potential to allow fuel to leak from the fuel rail, where the IPS is attached, into the engine compartment. An IPS design that can sustain impact damage during an accident and yet minimize or prevent fuel from leaking from the fuel rail would be highly desirable.

SUMMARY OF THE INVENTION

It is therefore an object of the present invention to provide an injection pressure sensor that minimizes fuel leakage from the fuel rail when the injection pressure sensor experiences impact loading.

In accordance with the object of this invention, a injection pressure sensor is provided which includes a sensor element for measuring the pressure of fluid within a fluid source. A tube member with a collapsible portion provides a fluid connection pathway between the fluid source and the sensor element. The collapsible portion generally closes the fluid connection pathway when the tube member is bent or damaged due to impact loading, such as from a vehicle crash.

Other objects and features of the present invention will become apparent when viewed in light of the detailed description of the preferred embodiment when taken in conjunction with the attached drawings and appended claims.

DESCRIPTION OF THE PREFERRED EMBODIMENT(S)

Figure 1:
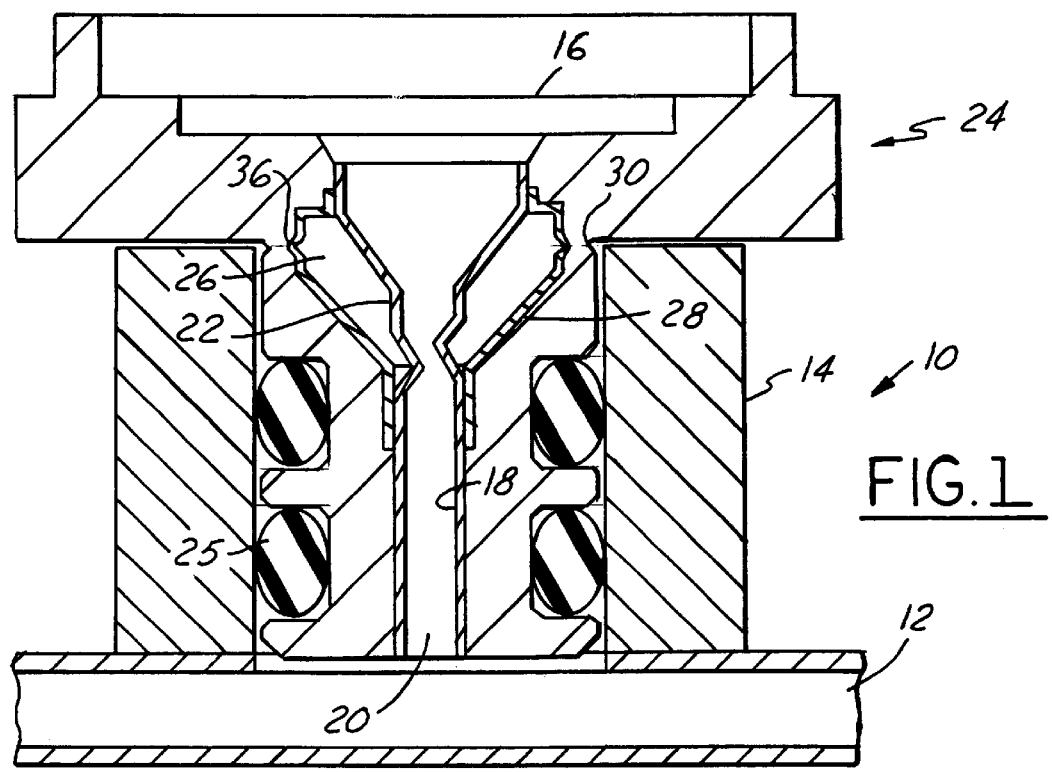
FIG. 1 is an illustration of an embodiment of an injection pressure sensor in accordance with the present invention.

Referring now to FIG. 1, which is an illustration of an injection pressure sensor 10 in accordance with the present invention. Although the injection pressure sensor 10 is intended for use in automotive fuel injection applications, the injection pressure sensor 10 is capable of being used in a variety of fuel applications including non-automotive applications.

The injection pressure sensor 10 is intended for use with a fluid source 12. In one embodiment, the fluid source 12 is a fuel rail. In one embodiment the fluid source 12 (fuel rail) utilizes a well 14 to secure the injection pressure sensor 10, however other methods of attaching the pressure sensor 10 to the fluid source 12 are known.

The injection pressure sensor 10 includes a sensor element 16 to measure the pressure of fluid from the fluid source 12. The sensor element 16 is kept in communication with the fluid source 12 through the use of a tube member 18. The tube member 18 forms a fluid pathway 20 to allow communication between the fluid source 20 and the sensor element 16. In one embodiment the tube member 18 is formed from steel, although a variety of known materials may be used.

Figure 2:
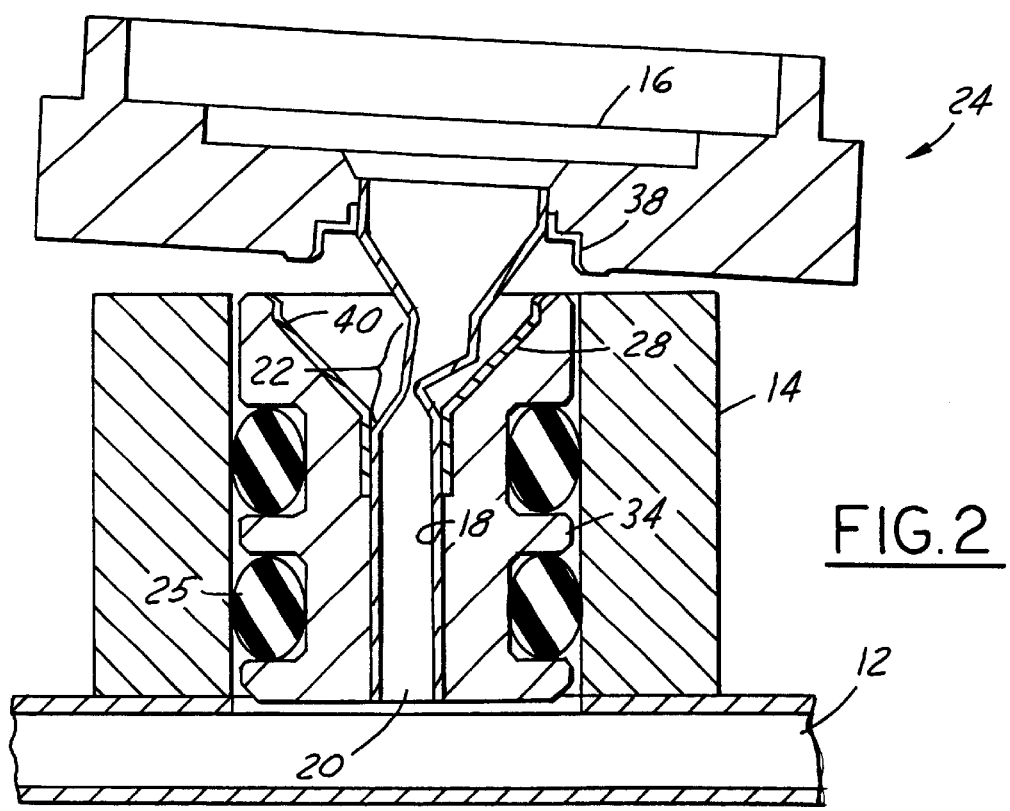
FIG. 2 is an illustration of the injection pressure sensor of FIG. 1, the illustration indicating the injection pressure sensor under initial impact loading.
Figure 3:
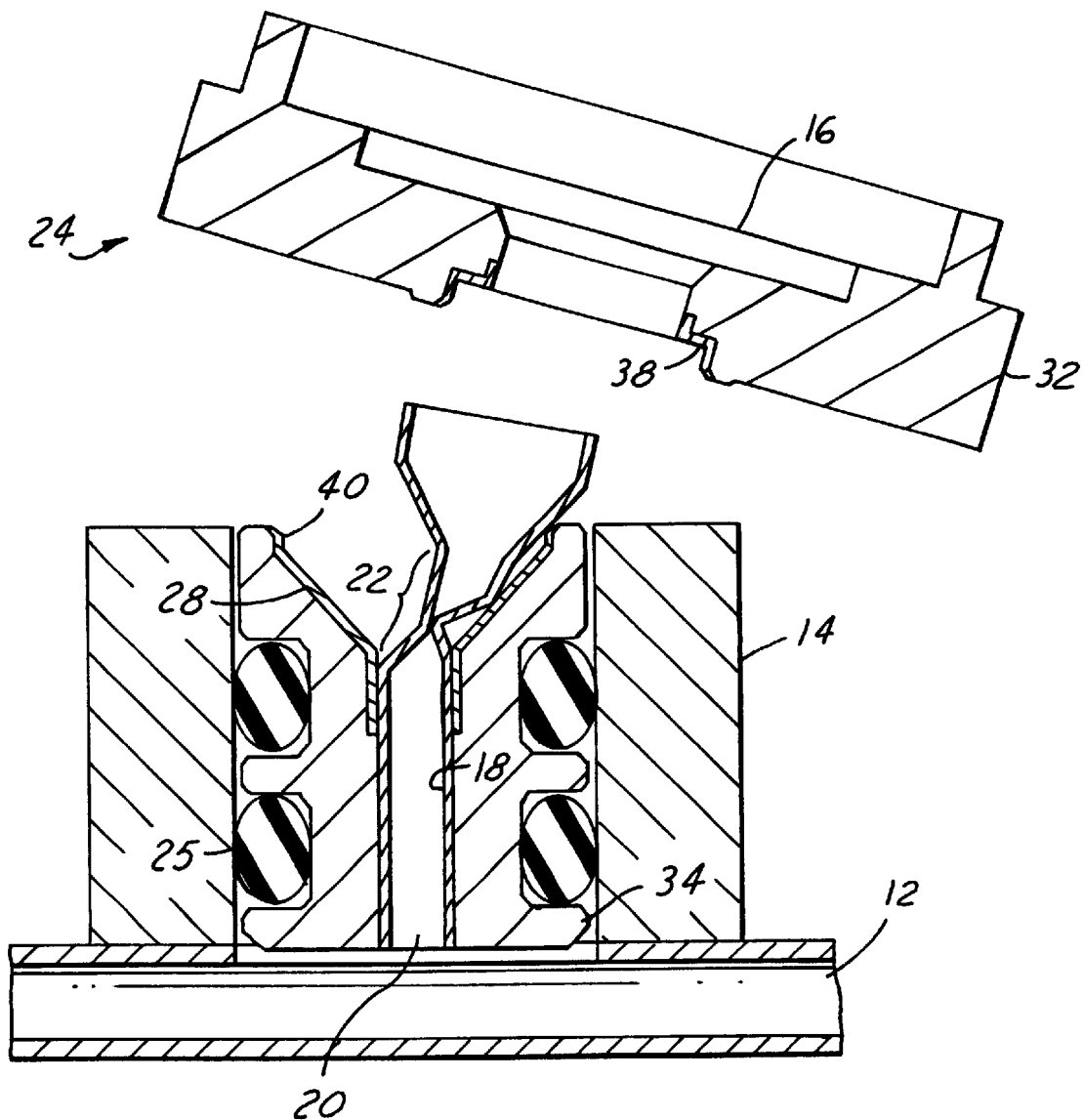
FIG. 3 is illustration of the injection pressure sensor of FIG. 1, the illustration indicating the injection pressure sensor after continued impact loading.

The tube member 18 has a collapsible portion 22. The collapsible portion 22 is formed such that when the tube member 18 is bent, the fluid pathway 20 becomes generally closed (see FIG. 2). The general closing of the fluid pathway 20 minimizes fluid leakage from the fluid source 12 when the tube member 18 is bent during impact loading. This provides a desirable function in many applications such as when the fluid source 12 is a fuel rail since prevention of fuel leakage from the injection pressure sensor 10 due to impact loading is highly desirable. In one embodiment, the collapsible portion 22 is formed by kinking the tube member 18 in two places, 180 degrees apart from one another and offset by approximately one tube radius, although a variety of methods are known to create the collapsible portion 22.

A sensor body 24 can be utilized to house the tube member 18 and the sensor element 16. The sensor body 24 is preferably used with o-ring elements 25 although o-rings 25 need not be used. In one embodiment, the sensor body 24 can be formed with an abscess 26. The abscess 26 is positioned such that the collapsible portion 22 of the tube member 18 is located within the abscess 26. This placement facilitates the desired bending of the tube member 18 during impact loading and the resulting general closing of the fluid pathway 20.

A collar element 28 may be utilized to facilitate the formation of the abscess 26. The collar element 28 is in connection with the tube member 18 and the sensor body 24 such that the abscess 26 is formed between portions of the collar element 28 and the tube member 18. In one embodiment, the collar element 28 is formed from a plastic material, although a variety of known materials may be used.

In one embodiment, the sensor body 24 can be formed with a grooved portion 30. The grooved portion 30 is formed such that when the injection pressure sensor 10 experiences impact loading, the sensor body 24 separates into a sensor body break-away section 32 and a sensor body base section 34. The use of a sensor body break-away section 32 facilitates the desired bending of the tube member 18 during impact loading. In addition, the use of a sensor body break-away section 32 can prevent further damage to the injection pressure sensor 10 during continuing impact loading. Although a grooved portion 30 has been described, a variety of known methods are available to create a sensor body 24 that separates into a sensor body break-away section 32 and a sensor body base section 34 when the injection pressure sensor 10 experiences impact loading.

When the collar element 28 is used in conjunction with a sensor body 24 with a sensor body break-away section 32 and a sensor body base section 34, it is preferable for the collar element 28 to be formed with a ridged portion 36. The ridged section 36 is formed such that when the injection pressure sensor 10 experiences impact loading, the collar element 28 separates into a collar break-away section 38 and a collar base section 40. The separation of the collar break-away section 38 from the collar base section 40 during impact loading facilitates the desired bending of the tube member 18 during impact loading. In addition, the use of a collar break-away section 38 can prevent further damage to the injection pressure sensor 10 during continued impact loading although the ridged portion 36 has been described, a variety of known methods are available to create a collar element 28 that separates into a collar break-away section 38 and a collar base section 40 when the injection pressure 10 experiences impact loading.

When the sensor body 24 and the collar element 28 are formed with their respective grooved portion 30 and ridged portion 36, it is preferable that the grooved portion 30 and the ridged portion 36 are generally in the same plane. When the grooved portion 30 and the ridged portion 36 are generally in the same plane, creating a fracture plane, it helps facilitate the separation of the break-away sections. It is further desirable that the grooved element 30 and ridged portion 36 be generally is the same plane as an edge of the well 14 to facilitate the formation of a frature plane. Although it is preferable for the grooved portion 30 and the ridged portion 36 to be generally in the same plane, they need not be, nor need they be generally in the same plane as the edge of the well 14.

While particular embodiments of the invention have been shown and described, numerous variations and alternate embodiments will occur to those skilled in the art. Accordingly, it is intended that the invention be limited only in terms of the appended claims.

What is claimed is:

1. A housing for an fuel injection pressure sensor comprising:
   a tube member, said tube member having a fluid pathway allowing fluid from a fluid source to communicate with the fuel injection pressure sensor, said tube member having a collapsible portion such that when said tube member is bent, said tube member permanently deforms and said fluid pathway is substantially closed.

2. A housing as described in claim 1, wherein said fluid source is a fuel rail.

3. A housing as described in claim 1 wherein said tube member is formed from steel.

4. A housing as described in claim 1 further comprising:
   a sensor body having an abscess portion, said abscess portion positioned to allow said tube member to bend when said sensor body experiences impact loads.

5. A housing as described in claim 4, wherein said sensor body is comprised of a sensor body break-away section and a sensor body base section, said sensor body break-away section capable of separating from said sensor body base section when said sensor body experiences impact loading.

6. A housing as described in claim 4, further comprising:
   a collar element positioned in connection with said tube member, said collar element facilitating the formation of said abscess portion.

7. A housing as described in claim 6, wherein said collar element is comprised of a collar break-away section and a collar base section, said collar break-away section capable of separating from said collar base section when said sensor body experiences impact loading.

8. A housing for an fuel injection pressure sensor comprising:
   a tube member, said tube member having a fluid pathway allowing fluid from a fluid source to communicate with the fuel injection pressure sensor, said tube member having a collapsible portion such that when said tube member is bent, said tube member permanently deforms and said fluid pathway is substantially closed;
   a sensor body having an abscess portion, said abscess portion positioned to allow said tube member to bend when said sensor body experiences impact loads; and
   a collar element positioned in connection with said tube member, said collar element facilitating the formation of said abscess portion.

9. A housing as described in claim 8, wherein said fluid source is a fuel rail.

10. A housing as described in claim 8, for use in an automotive fuel injection system.

11. A housing as described in claim 8, wherein said tube member is formed from steel.

12. A housing as described in claim 8, wherein said sensor body is comprised of a sensor body break-away section and a sensor body section, said sensor body break-away section capable of separating from said sensor body section when said sensor body experiences impact loading.

13. A housing as described in claim 12, wherein said sensor body has a grooved portion, said grooved portion formed to facilitate the separation of said sensor body break-away section from said sensor base section when said sensor body experiences impact loading.

14. A housing as described in claim 8, wherein said collar element is comprised of a collar break-away section and a collar base section, said collar break-away section capable of separating from said collar base section when said sensor body experiences impact loading.

15. A housing as described in claim 14, wherein said collar element has a ridged portion, said ridged portion formed to facilitate the separation of said collar break-away section from said collar base section when said sensor body experiences impact loading.

16. A housing as described in claim 8, wherein said sensor body is comprised of a sensor body break-away section and a sensor body section, said sensor body break-away section capable of separating from said sensor body section when said sensor body experiences impact loading; and
   wherein said collar element is comprised of a collar break-away section and a collar base section, said collar break-away section capable of separating from said collar base section when said sensor body experiences impact loading.

17. A housing as described in claim 16, wherein said sensor body has a grooved portion, said grooved portion formed to facilitate the separation of said sensor body break-away section from said sensor base section when said sensor body experiences impact loading; and
   wherein said collar element has a ridged portion, said ridged portion formed to facilitate the separation of said collar break-away section from said collar base section when said sensor body experiences impact loading.

18. A housing as described in claim 17, wherein said grooved portion and said ridged portion are generally in the same plane.

19. A method of minimizing fluid leakage from a housing for an fuel injection pressure sensor comprising the steps:

providing a fluid pathway between a fluid source and the fuel injection pressure sensor using a tube member;

bending said tube member; and permanently deforming a portion of said tube member as said tube member is bent, thereby substantially closing said fluid pathway.

20. A sensor body for use with a fluid pressure sensor comprising:

a tube member with a fluid pathway, said tube member having a collapsible portion;

wherein when the sensor body is subject to impact loading, said tube member bends and said collapsible portion permanently deforms creating a fluid restrictive area substantially preventing the passage of fluid through said fluid pathway.

21. A sensor body as described in claim 20 further comprising an abscess portion, said abscess portion facilitating the bending of said tube member when the sensor body is subject to impact loading.

22. A sensor body as described in claim 20 further comprising:

a sensor body base section; and a sensor body break-away section.

23. A sensor body as described in claim 22 wherein the fluid pressure sensor is positioned within said sensor body break-away section.

* * * * *